(12) United States Patent
Ohno (10) Patent No.: US 11,475,116 B2
(45) Date of Patent: Oct. 18, 2022

(54) TERMINAL DEVICE, INFORMATION PROCESSING SYSTEM, METHOD OF CONTROLLING TERMINAL DEVICE, AND PROGRAM

(71) Applicant: NEC CORPORATION, Tokyo (JP)

(72) Inventor: Takeo Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/488,349

(22) PCT Filed: Mar. 7, 2018

(86) PCT No.: PCT/JP2018/008760
§ 371 (c)(1),
(2) Date: Aug. 23, 2019

(87) PCT Pub. No.: WO2018/173752
PCT Pub. Date: Sep. 27, 2018

(65) Prior Publication Data
US 2020/0233946 A1    Jul. 23, 2020

(30) Foreign Application Priority Data
Mar. 21, 2017  (JP) .............. JP2017-054250

(51) Int. Cl.
G06F 21/34       (2013.01)
H04L 9/10        (2006.01)
H04L 9/08        (2006.01)

(52) U.S. Cl.
CPC .............. *G06F 21/34* (2013.01); *H04L 9/08* (2013.01); *H04L 9/10* (2013.01)

(58) Field of Classification Search
CPC . H04L 9/0897; H04L 9/10; H04L 9/08; H04L 9/0822; H04L 63/00;
(Continued)

(56) References Cited

U.S. PATENT DOCUMENTS 5,218,638 A *  6/1993  Matsumoto ........... H04L 9/0822
                                                    380/228
5,227,613 A *  7/1993  Takagi ................. G06K 7/0008
                                                    235/380

(Continued)

FOREIGN PATENT DOCUMENTS

JP     2004-234633 A     8/2004
JP     2005-267494 A     9/2005
(Continued)

OTHER PUBLICATIONS

Translation of the written description of Japanese Patent Document: JP 2006099533 A retrieved from USPTO Global Dossier (Year: 2006).*

(Continued)

*Primary Examiner* — Benjamin A Kaplan
(74) *Attorney, Agent, or Firm* — Sughrue Mion, PLLC (57) ABSTRACT

A terminal device that acquires record information recorded on an IC card and performs information processing includes: a terminal key acquisition unit configured to acquire a terminal key from a terminal key card different from the IC card; and an authentication unit configured to perform connection authentication with a server performing the connection authentication with the own terminal device using the terminal key.

4 Claims, 11 Drawing Sheets

(58) Field of Classification Search
CPC ........... H04L 63/0853; H04L 2463/062; H04L 63/0892; G06F 21/34; H04W 12/069
USPC ............................................................ 726/9
See application file for complete search history.

(56) References Cited

U.S. PATENT DOCUMENTS

| | | | | |
|---|---|---|---|---|
| 5,857,024 | A * | 1/1999 | Nishino | ................ G06F 21/34 235/380 |
| 2004/0256470 | A1* | 12/2004 | Takami | ............... H04L 63/0464 235/492 |
| 2007/0094512 | A1* | 4/2007 | Nomiya | ............. H04L 63/0853 713/186 |

FOREIGN PATENT DOCUMENTS

| | | | |
|---|---|---|---|
| JP | 2006-099533 | A | 4/2006 |
| JP | 2008-199206 | A | 8/2008 |
| JP | 2010-287051 | A | 12/2010 |
| JP | 2012-065123 | A | 3/2012 |

OTHER PUBLICATIONS

International Search Report for PCT/JP2018/008760 dated Jun. 5, 2018 [PCT/ISA/210].
Japanese Office Action for JP Application No. 2019-507519 dated Jan. 25, 2022 with English Translation.
Japanese Office Communication for JP Application No. 2019-507519 dated Jul. 5, 2022 with English Translation.

* cited by examiner

TERMINAL DEVICE, INFORMATION PROCESSING SYSTEM, METHOD OF CONTROLLING TERMINAL DEVICE, AND PROGRAM

TECHNICAL FIELD

The present invention relates to a terminal device, an information processing system, a method of controlling terminal device, and a program.

BACKGROUND ART

Diverse integrated circuit (IC) cards are used for managing information regarding electronic money, or entering or leaving a room. To safely manage information using such IC cards, authentication technologies for the IC cards using cryptographic keys are essential. Patent Documents 1 and 2 disclose technologies for preventing leakage of cipher keys of IC cards as related technologies.

CITATION LIST

Patent Literature

Patent Document 1

Japanese Unexamined Patent Application, First Publication No. 2012-065123

Patent Document 2

Japanese Unexamined Patent Application, First Publication No. 2008-199206

SUMMARY OF INVENTION

Technical Problem

Incidentally, when various IC cards are used for authentication in management of information regarding electronic money, or entering or leaving a room, dedicated modules or chips such as secure access modules (SAMs) capable of performing an encryption decoding process and secure storage of cryptographic key data with a tamper resistance property are generally used. Such dedicated modules or chips have low versatility, but are widely used.

Therefore, a technology capable of performing authentication through a device with high versatility while ensuring security in the authentication is required.

An object of the present invention is to provide a terminal device, an information processing system, a method of controlling the terminal device, and a program capable of solving the foregoing problems.

Solution to Problem

To achieve the foregoing object, according to a first aspect of the present invention, there is provided a terminal device that acquires record information recorded on an IC card and performs information processing. The terminal device includes: a terminal key acquisition unit configured to acquire a terminal key from a terminal key card different from the IC card; and an authentication unit configured to perform connection authentication with a server performing the connection authentication with the own terminal device using the terminal key.

According to a second aspect of the present invention, there is provided an information processing system including: the terminal device according to the first aspect; and a terminal key card configured to store the terminal key encrypted using a second card key different from a card key used when the record information recorded on the IC card is encrypted.

According to a third aspect of the present invention, there is provided a method of controlling a terminal device that acquires record information recorded on an IC card and performs information processing. The method of controlling the terminal device includes: acquiring a terminal key from a terminal key card different from the IC card; and performing connection authentication with a server performing the connection authentication with the own terminal device using the terminal key.

According to a fourth aspect of the present invention, there is provided a program causing a computer of a terminal device that acquires record information recorded on an IC card and performs information processing to perform: acquiring a terminal key from a terminal key card different from the IC card; and performing connection authentication with a server performing the connection authentication with the own terminal device using the terminal key.

Advantageous Effects of Invention

According to the present invention, it is possible for a device with high versatility to perform authentication while ensuring security in the authentication.

DESCRIPTION OF EMBODIMENTS

First Embodiment

Hereinafter, embodiments will be described in detail with reference to the drawings.

A configuration of an information processing system 1 according to a first embodiment of the present invention will be described.

Figure 1:
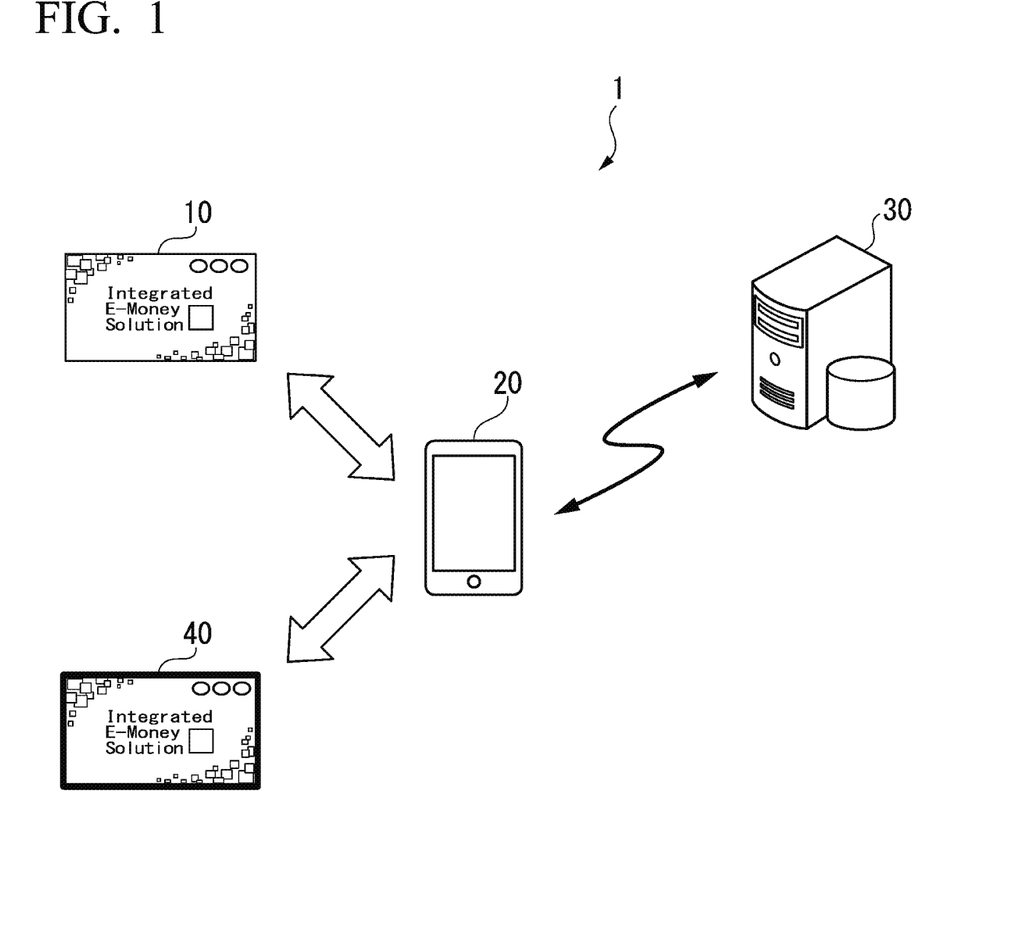
FIG. 1 is a diagram showing a configuration of an information processing system according to a first embodiment of the present invention.

The information processing system 1 according to the first embodiment of the present invention includes an IC card 10, a terminal device 20, a server 30, and a terminal key card 40, as shown in FIG. 1.

Figure 2:
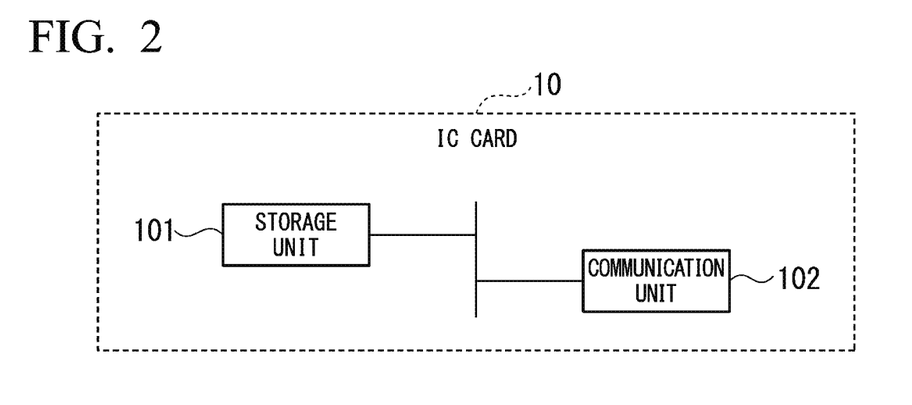
FIG. 2 is a diagram showing a configuration of an IC card according to the first embodiment of the present invention.

The IC card 10 is used when information is managed. The IC card 10 includes a storage unit 101 and a communication unit 102, as shown in FIG. 2.

The storage unit 101 stores information which is a target of information processing by the terminal device 20. Specifically, when the IC card 10 is used for managing information regarding electronic money, the storage unit 101 stores, for example, information such as the content of several of the most recent transactions, the card number, the balance, and the like. The information stored by the storage unit 101 is encrypted with a card key Z (a first card key).

As another embodiment of the present invention, when the IC card 10 is used for managing information regarding entering or leaving a room, the storage unit 101 may store, for example, information such as a card number, the number of entries and exits, and entry and exit times.

Figure 3:
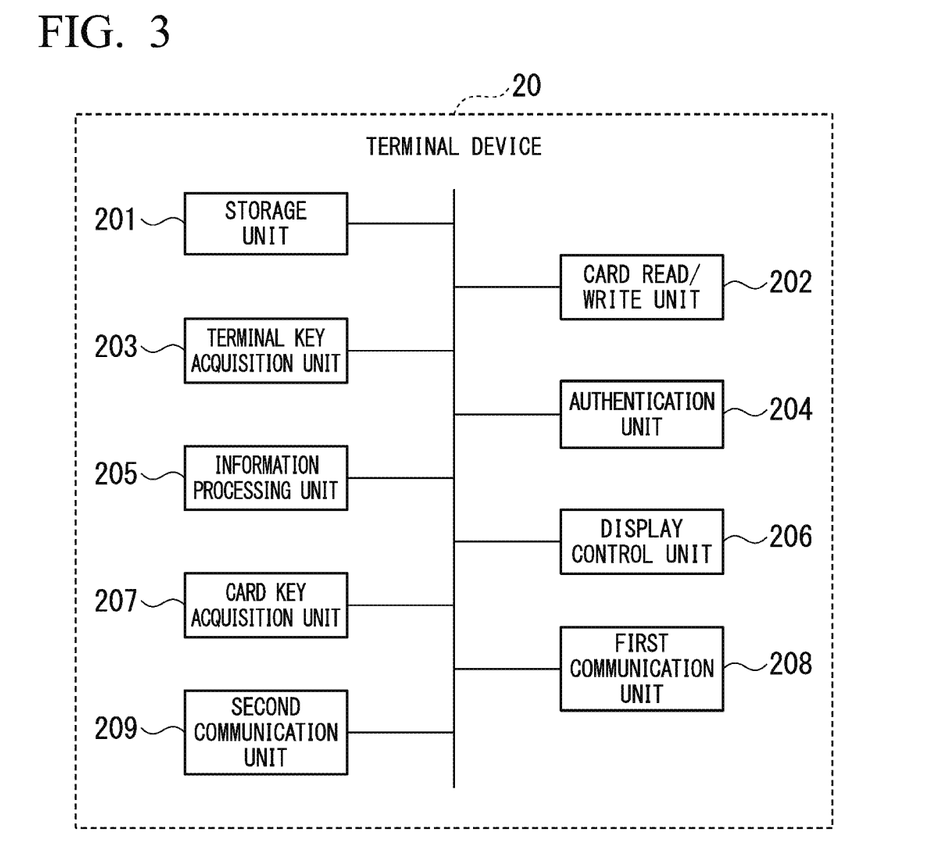
FIG. 3 is a diagram showing a configuration of a terminal device according to the first embodiment of the present invention.

The communication unit 102 performs communication with a second communication unit 209 included in the terminal device 20 to be described below. The communication performed between the second communication unit 209 and the communication unit 102 is performed in conformity with, for example, near field radio communication (NFC).

The terminal device 20 executes an application program for reading and writing information recorded on the IC card 10 and acquires information recorded on the IC card 10 to perform information processing. As shown in FIG. 3, the terminal device 20 includes a storage unit 201, a card read/write unit 202, a terminal key acquisition unit 203, an authentication unit 204, an information processing unit 205, a display control unit 206, a card key acquisition unit 207, a first communication unit 208, and a second communication unit 209. The terminal device 20 is, for example, a smartphone or a tablet terminal.

The storage unit 201 stores an operating system (OS) that is executed by the terminal device 20, an application acquiring information recorded on the IC card 10 and performing information processing, and information such as the card key Z. Information indicating the card key Z stored in the storage unit 201 is encrypted with a terminal key to be described below.

The card read/write unit 202 reads and writes information stored in the storage unit 101 of the IC card 10. The card read/write unit 202 reads and writes information of a storage unit 401 to be described below.

When writing information on the storage unit 101, the card read/write unit 202 encrypts the information with the card key Z and causes the storage unit 101 to store the encrypted information. When writing the card key Z on the storage unit 201, the card read/write unit 202 encrypts the card key Z with the terminal key and causes the storage unit 201 to store the encrypted card key Z. When writing the terminal key on the storage unit 401, the card read/write unit 202 encrypts the terminal key with a card key X (a second card key) and causes the storage unit 401 to store the encrypted terminal key.

The terminal key acquisition unit 203 acquires the terminal key from the terminal key card 40. The terminal key card 40 is different from the IC card 10.

The authentication unit 204 performs authentication of the connection between the terminal device 20 and the server 30 using the terminal key acquired by the terminal key acquisition unit 203. The authentication unit 204 may transmit an authentication request signal including the terminal key to the server 30.

The information processing unit 205 acquires information stored by the storage unit 101 of the IC card 10. The information processing unit 205 performs information processing using the acquired information. For example, the information processing unit 205 transmits an instruction signal for causing a storage unit 301 of the server 30 to record the information acquired from the storage unit 101 to an information management processing unit 302 to be described below. The information processing unit 205 may perform information processing based on the information acquired from the storage unit 101 of the IC card 10 and transmit an instruction signal to the server 30 for causing the server 30 to record information including a result of the information processing. When information regarding electronic money is stored in the storage unit 101 of the IC card 10, the information processing unit 205 performs payment using the electronic money as information processing and transmits an instruction signal including information regarding the payment to the server 30. When information regarding entering or leaving a predetermined region is stored in the storage unit 101 of the IC card 10, the information processing unit 205 performs determination of whether entering and leaving the predetermined region are permitted and transmits an instruction signal including a determination result as information processing to the server 30.

The display control unit 206 controls display of a display unit included in the terminal device 20. For example, when an application program for reading and writing the IC card 10 is activated, the display control unit 206 controls the display unit to display a message "Please hold a terminal key card over the terminal device" according to the activated application program.

When an application program for reading and writing of the IC card 10 is activated, the card key acquisition unit 207 acquires the card key X from the server 30. The first communication unit 208 communicates with the server 30.

The second communication unit 209 communicates with the IC card 10 and the terminal key card 40. The communication performed with the IC card 10 and the terminal key card 40 by the second communication unit 209 is performed in conformity with, for example, near field radio communication (NFC).

Figure 4:
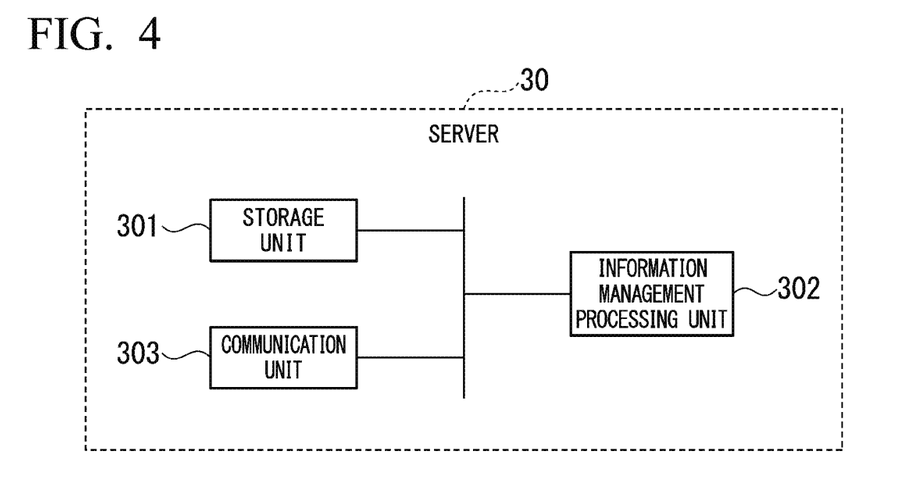
FIG. 4 is a diagram showing a configuration of a server according to the first embodiment of the present invention.

The server 30 performs connection authentication with the terminal device 20. The server 30 includes a storage unit 301, the information management processing unit 302, and a communication unit 303, as shown in FIG. 4.

The storage unit 301 stores the terminal key, the card key X, and the card key Z. The terminal key is used when information transmitted and received between the terminal device 20 and the server 30 is encrypted and decrypted. The card key X is used when information stored in the storage unit 401 to be described below is encrypted and decrypted. The card key Z is used when information stored in the storage unit 101 is encrypted and decrypted. The storage unit 301 stores information acquired from the information processing unit 205 by the information management processing unit 302 on the basis of an instruction from the information management processing unit 302.

The information management processing unit 302 writes the information acquired from the storage unit 101 by the information processing unit 205 on the storage unit 301 on the basis of an instruction signal received from the information processing unit 205.

The communication unit 303 communicates with the first communication unit 208.

Figure 5:
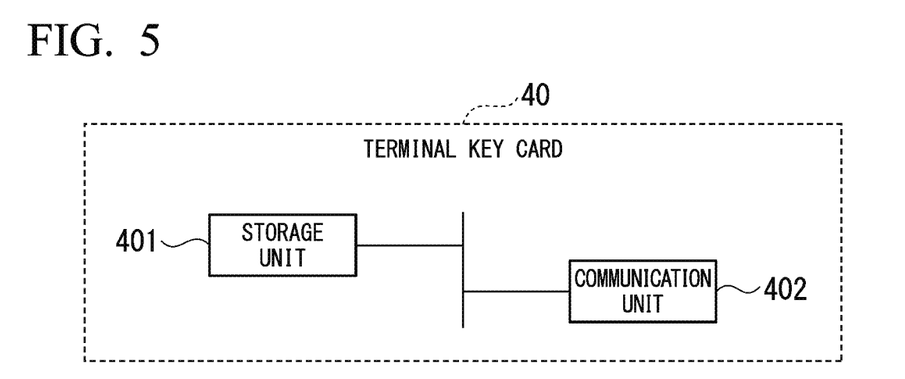
FIG. 5 is a diagram showing a configuration of a terminal key card according to the first embodiment of the present invention.

The terminal key card 40 stores the terminal key. The terminal key card 40 includes a storage unit 401 and a communication unit 402, as shown in FIG. 5.

The storage unit 401 stores the terminal key advance. The stored terminal key is encrypted with the card key X.

The communication unit 402 communicates with the second communication unit 209 included in the terminal device 20.

When there are a plurality of kinds of IC cards 10, it is necessary to prepare card keys equal in number to the kinds of IC cards 10. For example, when there are two kinds of IC cards, SUICA (registered trademark) and nanaco (registered trademark), as the IC cards 10, one card key for SUICA and one card key for nanaco are necessary Here, a common card key is used for IC cards 10 of the same kind. Therefore, even when there are a plurality of IC cards 10 of the same kind, one card key may be prepared.

A process of the information processing system 1 according to the first embodiment of the present invention will be described.

Figure 6:
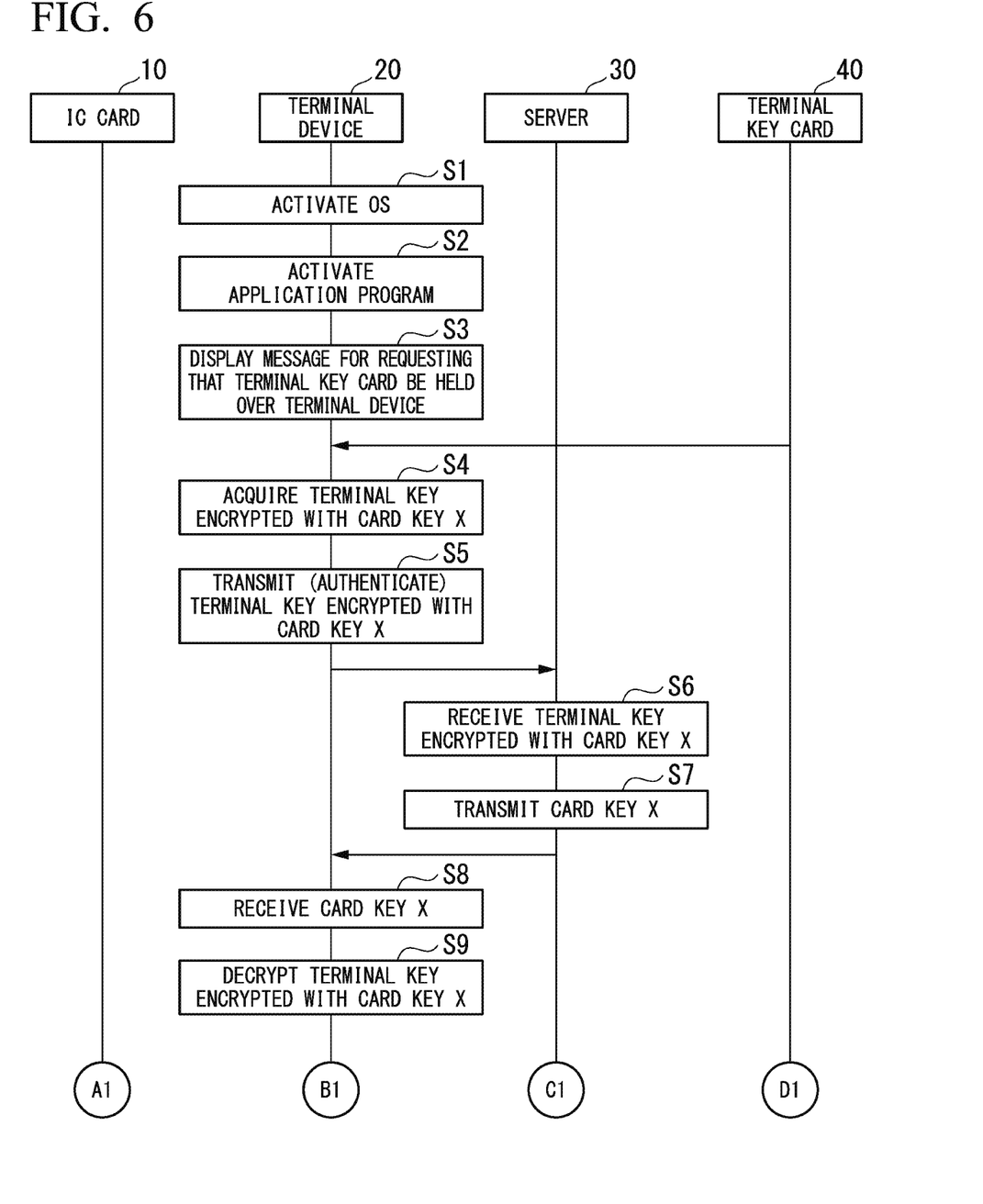
FIG. 6 is a first diagram showing a process flow of the information processing system according to the first embodiment of the present invention.
Figure 7:
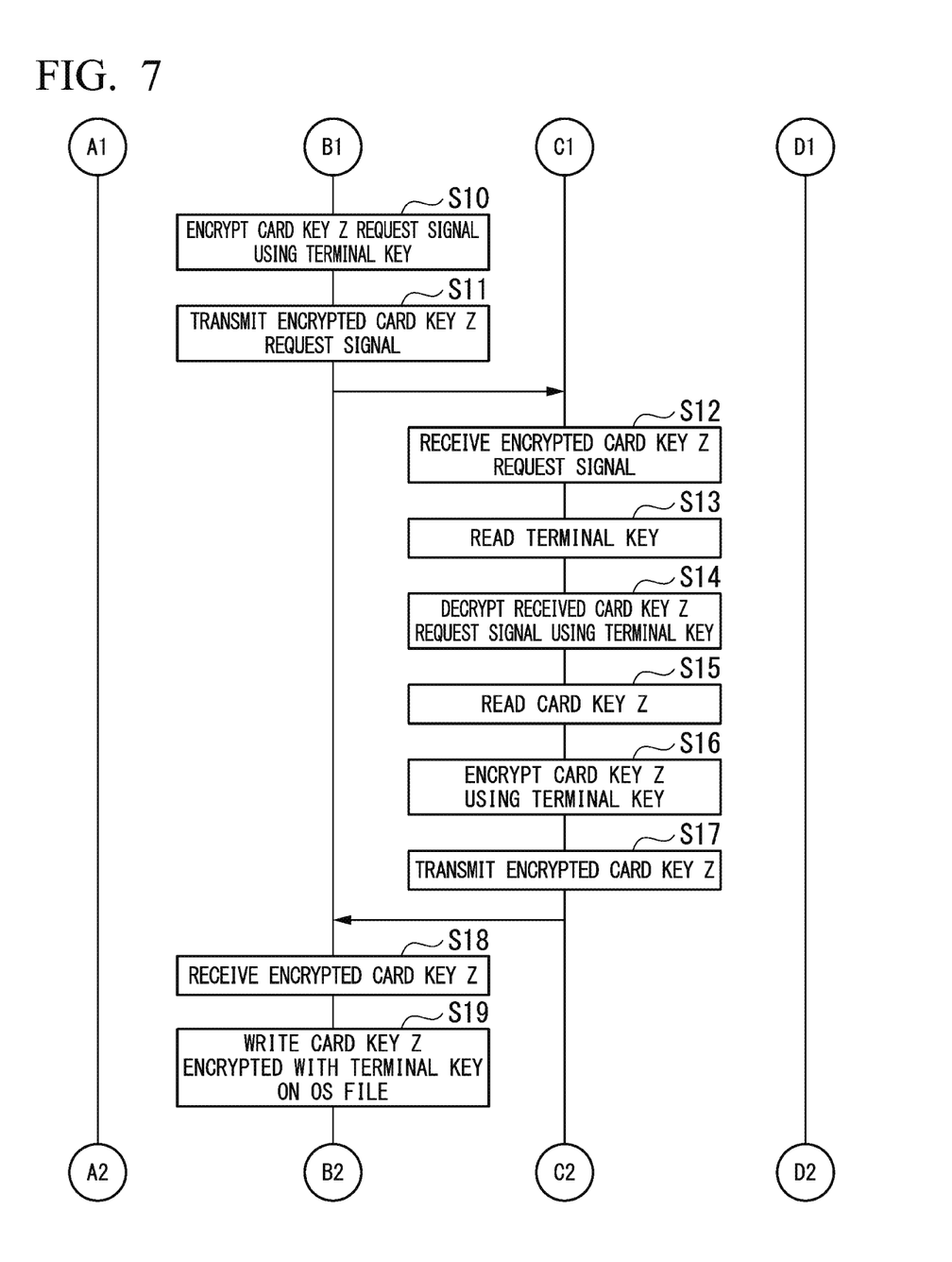
FIG. 7 is a second diagram showing the process flow of the information processing system according to the first embodiment of the present invention.
Figure 8:
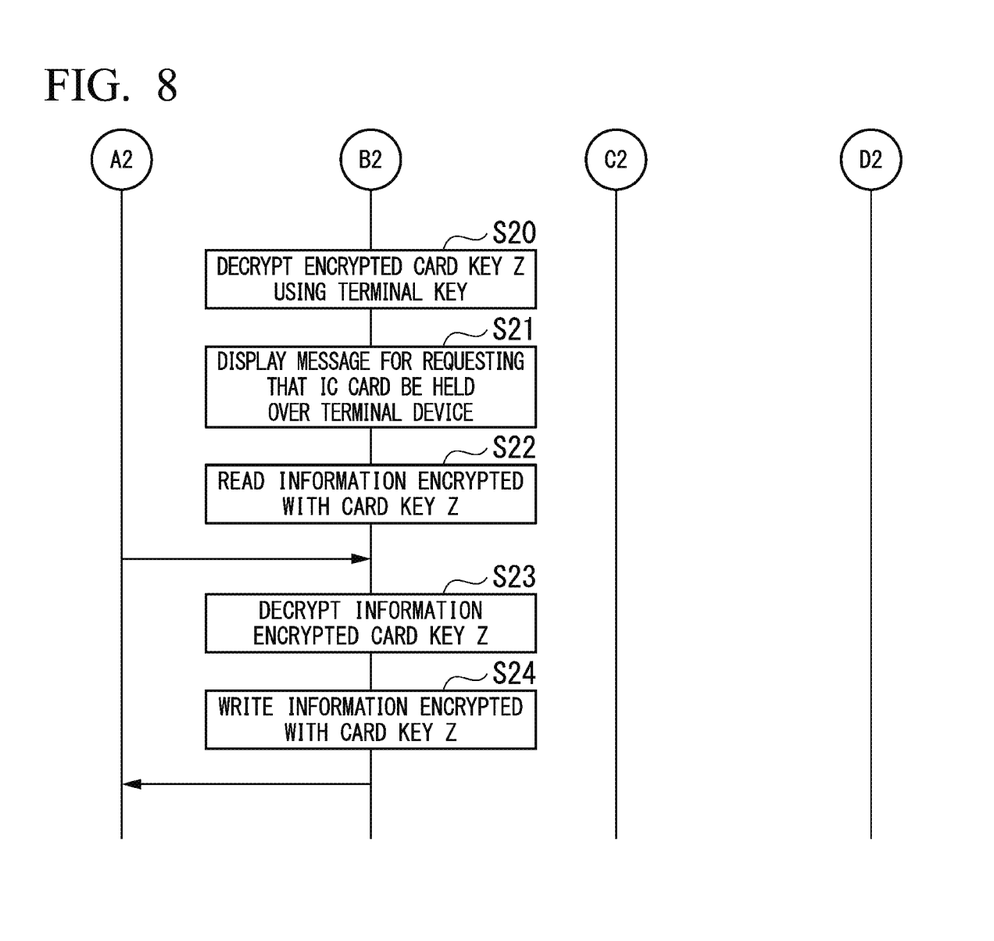
FIG. 8 is a third diagram showing the process flow of the information processing system according to the first embodiment of the present invention.

Here, an example of a process flow of the information processing system 1 shown in FIGS. 6 to 8 will be described. FIGS. 6 to 8 show an exemplary example of a process flow of payment performed using the IC card 10 that has an electronic money function when a user shops in a store.

A staff member of a store (more preferably, a person of interest carrying the terminal key card 40, for example, an owner, a store manager, or the like) turns power of the terminal device 20 on. Power is supplied to the terminal device 20 and an OS is activated (step S1).

The user performs an operation of activating an application program for reading and writing of the IC card 10 on the terminal device 20. In response to the operation by the user, the application program is activated on the terminal device 20 (step S2).

When the application program for reading and writing of the IC card 10 is activated, the display control unit 206 controls the display unit to display text "Please hold a terminal key card over the terminal device" in accordance with the activated application program (step S3).

The store staff member holds the terminal key card 40 over the terminal device 20. The terminal key acquisition unit 203 acquires the terminal key encrypted with the card key X from the terminal key card 40 via the card react/write unit 202 (step S4).

The authentication unit 204 transmits the terminal key acquired by the terminal key acquisition unit 203 to the server 30 via the first communication unit 208 to request authentication of the connection between the terminal device 20 and the server 30 (step S5).

In the server 30, the information management processing unit 302 receives the terminal key from the terminal key acquisition unit 203 via the communication unit 303 (step S6). The information management processing unit 302 authenticates the terminal device 20 based on the received terminal key. When the information management processing unit 302 authenticates the terminal device 20, the connection between the terminal device 20 and the server 30 is established. The information management processing unit 302 transmits the card key X to the terminal device 20 (step S7).

In the terminal device 20, the card key acquisition unit 207 receives the card key X from the server 30 via the first communication unit 208 (step S8).

The terminal key acquisition unit 203 decrypts the terminal key encrypted with the card key X using the card key X received from the server 30 by the card key acquisition unit 207 (step S9). Thus, the terminal key acquisition unit 203 acquires the decrypted terminal key.

The card key acquisition unit 207 encrypts a card key Z request signal for requesting the card key Z using the terminal key (step S10). The card key acquisition unit 207 transmits the encrypted card key Z request signal to the server 30 (step S11).

In the server 30, the information management processing unit 302 receives the card key Z request signal encrypted with the terminal key via the communication unit 303 (step S12). The terminal key used when the card key acquisition unit 207 encrypts the card key Z request signal is stored in advance by the storage unit 301. The information management processing unit 302 reads the terminal key from the storage unit 301 (step S13). The information management processing unit 302 decrypts the received card key Z request signal using the read terminal key (step S14). Thus, the information management processing unit 302 acquires the decrypted card key Z request signal.

The information management processing unit 302 reads the card key Z from the storage unit 301 in accordance with the decrypted card key Z request signal (step S15). The information management processing unit 302 encrypts the read card key Z using the terminal key (step S16). The information management processing unit 302 transmits the encrypted card key Z to the terminal device 20 via the communication unit 303 (step S17).

In the terminal device 20, the card key acquisition unit 207 receives the card key Z encrypted with the terminal key from the information management processing unit 302 via the first communication unit 208 (step S18). The card key acquisition unit 207 writes the card key Z encrypted with the received terminal key on an OS file stored in the storage unit 201 (step S19).

The card key acquisition unit 207 decrypts the card key Z encrypted using the terminal key (step S20). Thus, the card key acquisition unit 207 acquires the decrypted card key Z.

When the card key acquisition unit 207 decrypts the card key Z encrypted using the terminal key, the display control unit 206 controls the display unit to display a message "Please hold an IC card over the terminal device" (step S21).

The user holds the IC card 10 over the terminal device 20. The information processing unit 205 reads information encrypted with the card key Z stored in the storage unit 101 of the IC card 10 via the card read/write unit 202 (step S22). The encrypted information includes, for example, the content of several of the most recent transactions, the card number, the balance, and the like. The information processing unit 205 decrypts the information encrypted with the card key Z using the card key Z decrypted by the card key acquisition unit 207 (step S23). Thus, the information processing unit 205 acquires the decrypted information in the IC card 10. The information processing unit 205 performs, as information processing, a payment process for the user's shopping based on the information acquired from the IC card 10.

The information processing unit 205 encrypts information such as the balance and the content of the transaction in accordance with present shopping with the card key Z and writes the encrypted information on the storage unit 101 via the card read/write unit 202 (step S24).

The information processing system 1 according to the first embodiment of the present invention has been described above. In the information processing system 1 according to the first embodiment of the present invention, the terminal device 20 acquires record information recorded on the IC card 10 and performs information processing. The terminal device 20 includes the terminal key acquisition unit 203 and the authentication unit 204. The terminal key acquisition unit 203 acquires the terminal key from the terminal key card 40 different from the IC card 10. The authentication unit 204 uses the terminal key in connection authentication with the server 30 performing the connection authentication with the terminal device 20.

With the foregoing configuration, the terminal device 20 can perform authentication through a device with high versatility while ensuring security in the authentication.

Specifically, in the information processing system 1 according to the first embodiment of the present invention, it is necessary to hold the terminal key card 40 over the terminal device 20 when the application program is activated. This takes effort from the user. However, the terminal key card 40 can be kept in a location different from the terminal device 20, thereby reducing a risk of theft or illegal use than a system in which SAM including a terminal key is contained in the terminal device.

The information in the IC card 10 is encrypted with the card key Z. The terminal key in the terminal key card 40 is encrypted with the card key X. The card key Z on the OS file stored in the storage unit 201 is encrypted with the terminal key. In this way, information or keys stored in the IC card 10, the terminal key card 40, the terminal device 20, and the like are encrypted with different keys, and security is ensured in authentication.

As described in the information processing system 1 according to the first embodiment of the present invention, the technology described in the present invention can also be applied to a terminal device 20 such as a smartphone or a tablet terminal which does not have a dedicated chip or module such as SAM. Thus, it is possible to perform authentication through a device with high versatility while ensuring security.

Second Embodiment

A configuration of an information processing system 1 according to a second embodiment of the present invention will be described.

The information processing system 1 according to the second embodiment of the present invention includes the IC card 10, the terminal device 20, the server 30, and the terminal key card 40 as in the information processing system 1 according to the first embodiment of the present invention.

A process of the information processing system 1 according to the second embodiment of the present invention will be described.

Here, an example of a process flow of the information processing system 1 shown in FIGS. 9 to 11 will be described.

The process of the information processing system 1 according to the second embodiment of the present invention to be described here is an example of a process when the card key Z encrypted with a terminal key received from the server 30 by the terminal device 20 is not stored on an OS file stored in the storage unit 201. The storage unit 201 does not store the card key Z, and thus security of the information processing system 1 becomes more robust.

Figure 9:
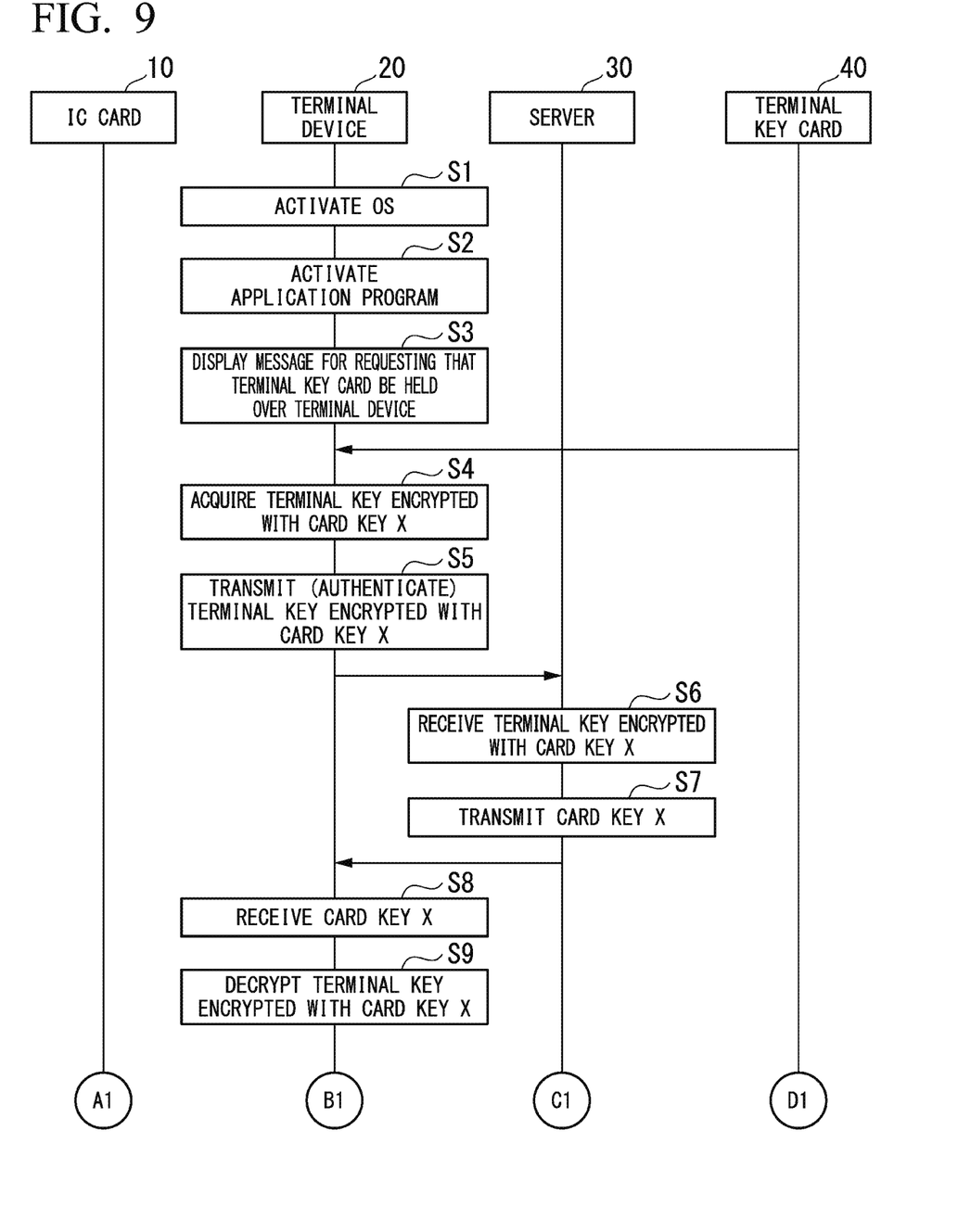
FIG. 9 is a first diagram showing a process flow of the information processing system according to a second embodiment of the present invention.
Figure 10:
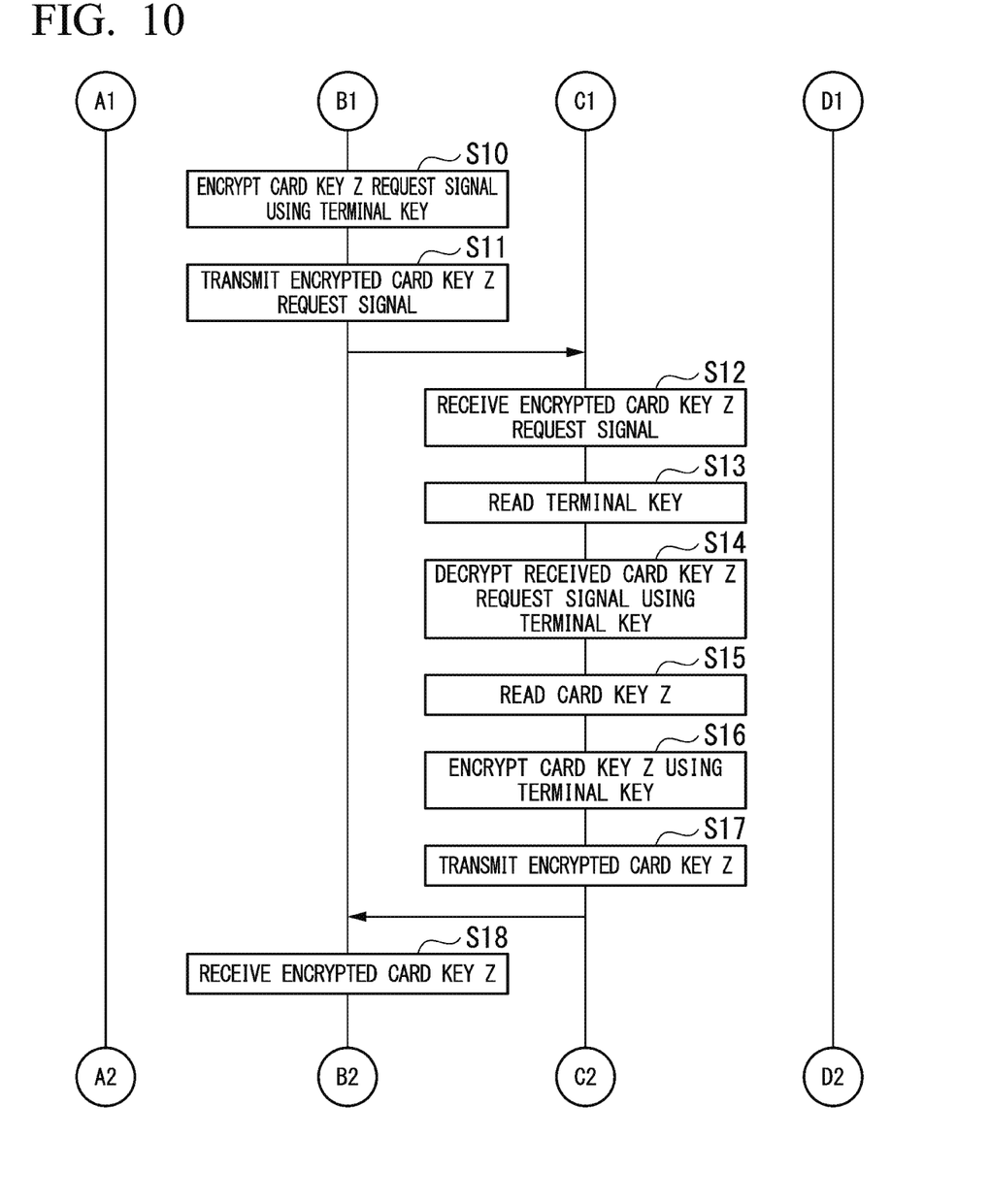
FIG. 10 is a second diagram showing the process flow of the information processing system according to the second embodiment of the present invention.
Figure 11:
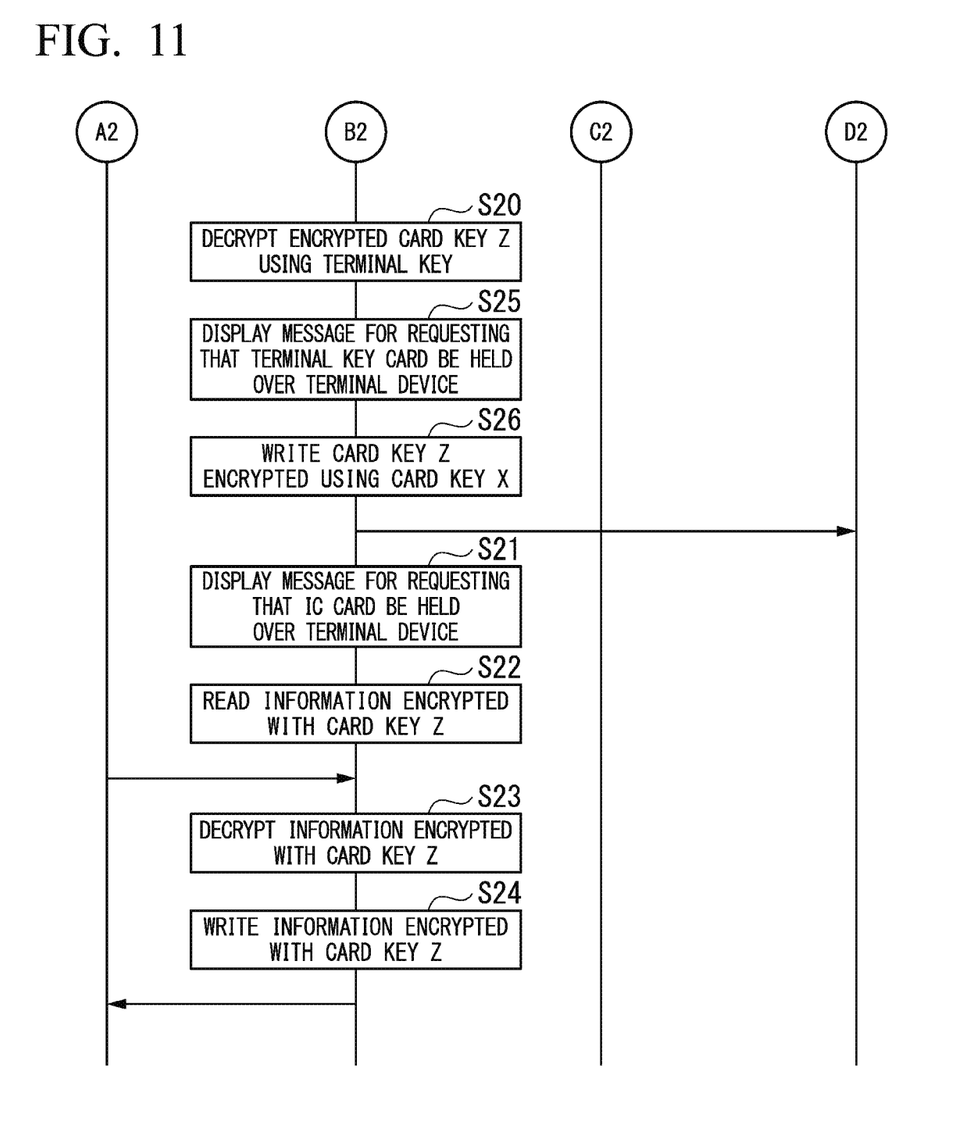
FIG. 11 is a third diagram showing the process flow of the information processing system according to the second embodiment of the present invention.

In the information processing system 1 according to the second embodiment of the present invention, as shown in FIGS. 9 to 11, the processes of steps S1 to S18 are performed and the process of step S20 is performed. The processes of steps S1 to S18 are the same as the processes of steps S1 to S18 in FIGS. 6 and 7 described in the first embodiment, and thus the description thereof will be omitted.

When the card key acquisition unit 207 decrypts the card key Z encrypted using the terminal key, the display control unit 206 controls a display unit to display a message "Please hold a terminal key card over the terminal device" (step S25).

When the user holds the terminal key card 40 over the terminal device 20, the card key acquisition unit 207 encrypts the decrypted card key Z with the card key X and writes the encrypted card key Z on the terminal key card 40 via the card read/write unit 202 (step S26).

When the processes of steps S25 and S26 are performed once (that is, when the process of storing the encrypted card key Z in the terminal key card 40 is performed once), the processes are not performed on subsequent occasions in which the same kind of IC card 10 is authenticated.

The information processing system 1 according to the second embodiment of the present invention has been described above. In the information processing system 1 according to the second embodiment of the present invention, the card key acquisition unit 207 encrypts the decrypted card key Z with the card key X and writes the encrypted card key Z on the terminal key card 40 via the card read/write unit 202. By doing this, it is not necessary for the terminal device 20 to preserve the card key Z encrypted with the terminal key received from the server 30 by the terminal device 20 on the OS file stored in the storage unit 201. As a result, security of authentication in the information processing system 1 according to the second embodiment of the present invention is higher than security of authentication in the information processing system 1 according to the first embodiment of the present invention.

In the information processing system 1 according to the second embodiment of the present invention, the card key acquisition unit 207 writes card key Z encrypted with the terminal key received from the server 30 by the terminal device 20 on the terminal key card 40, as described above. However, in the information processing system 1 according to another embodiments of the present invention, the storage unit 401 may store the card key Z in advance along with the terminal key. In this case, both the terminal key and the card key Z are encrypted with the card key X.

Figure 12:
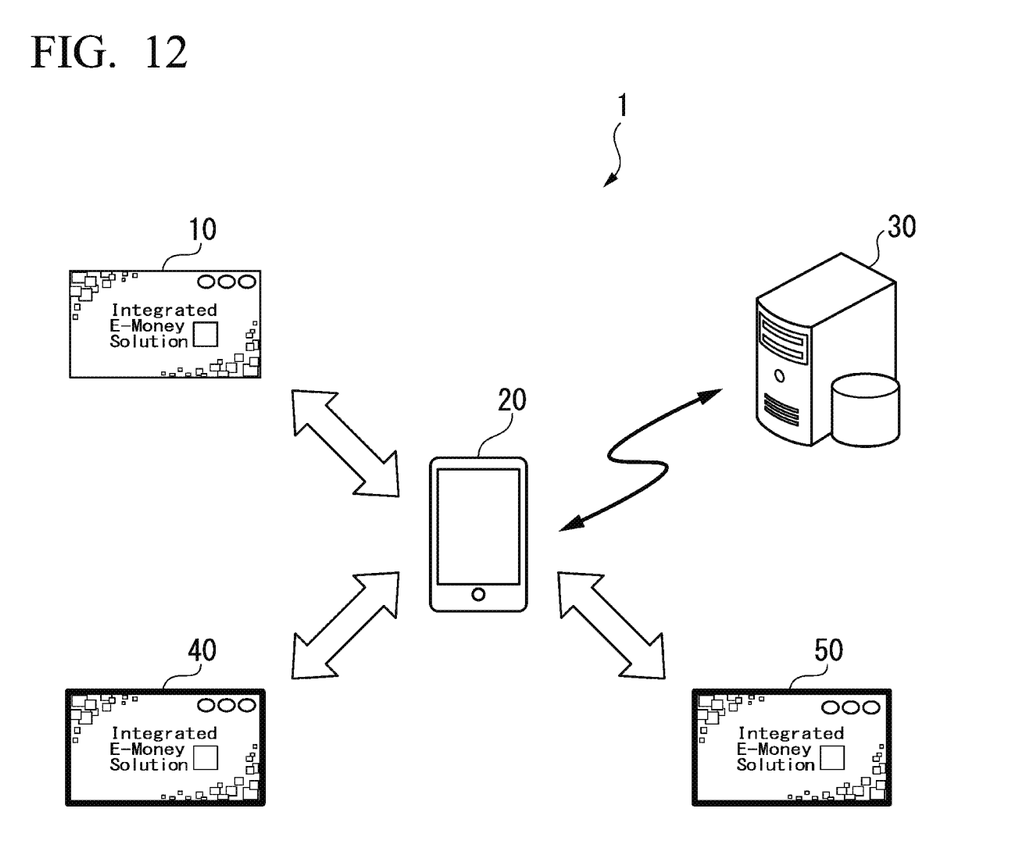
FIG. 12 is a diagram showing a configuration of an information processing system according to another embodiment of the present invention.

In the information processing system 1 according to each embodiment of the present invention, the card key Z is acquired from the server 30 by the terminal device 20, as described above. However, as shown in FIG. 12, the information processing system 1 according to still another embodiments of the present invention may include a card key card 50 different from the IC card 10 and the terminal key card 40, and the card key card 50 may store the card key Z. At this time, the storage unit 301 stores the card key Y in addition to the terminal key, the card key X, and the card key Z. The storage unit of the card key card 50 may store the card key Z encrypted with the card key Y.

When the terminal device 20 reads the card key Z from the storage unit of the card key card 50, the terminal device 20 acquires the card key Y from the server 30 instead of acquiring the card key Z from the server 30 as in the first embodiment of the present invention. The terminal device 20 decrypts the card key Z in the card key card 50 using the acquired card key Y. The terminal device 20 may read information of the IC card 10 using the decrypted card key Z.

A minimum configuration of the terminal device 20 according to an embodiment of the present invention will be described.

Figure 13:
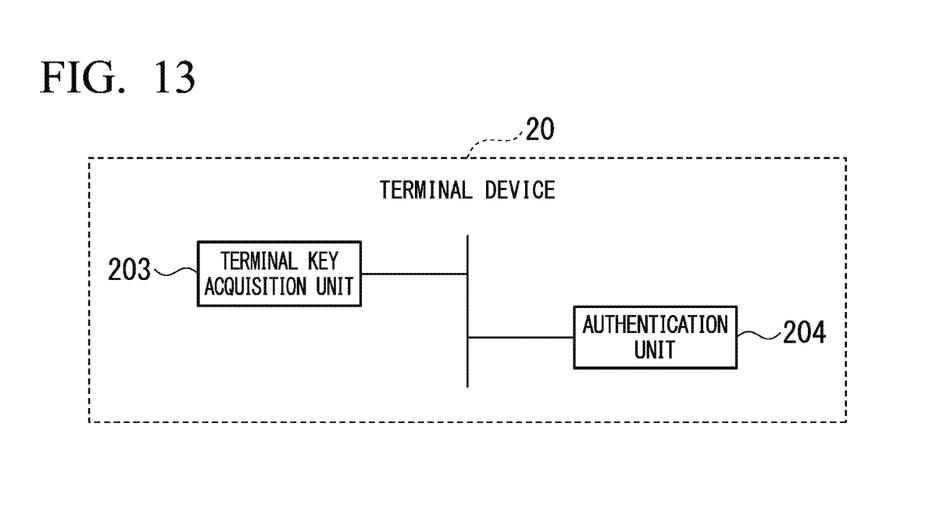
FIG. 13 is a diagram showing a minimum configuration of a terminal device according to an embodiment of the present invention.

The terminal device 20 having the minimum configuration according to the embodiment of the present invention includes the terminal key acquisition unit 203 and the authentication unit 204, as shown in FIG. 13.

The terminal key acquisition unit 203 acquires a terminal key from the terminal key card 40 different from the IC card 10.

The authentication unit 204 uses the terminal key in connection authentication with the server 30 performing the connection authentication with the terminal device 20.

With the foregoing configuration, the terminal device 20 can perform authentication through a device with high versatility while ensuring security in the authentication.

In an embodiment of the present invention, when information such as the terminal key or the card key Z is stored in advance in the terminal key card 40, the information may be written in accordance with a method to be described below.

Software that generates the terminal key card 40 is activated in the terminal device 20 (or the terminal device 20 using a reader/writer containing an SAM) in which access is restricted by an Internet protocol (IP) address, a virtual private network (VPN), biometric authentication, or the like.

The server 30 generates a terminal key and transmits the generated terminal key to the terminal device 20.

The terminal device 20 encrypts the terminal key received from the server 30 using the card key X and writes the encrypted terminal key on the terminal key card 40.

According to yet another embodiment of the present invention, the terminal key card 40 may perform authentication using a personal identification number (PIN) or a biometric authentication technology such as a face/fingerprint at the time of use. In this way, the information processing system 1 can perform authentication with higher security than authentication using SAM.

According to further embodiment of the present invention, the terminal key card 40 may perform authentication with a combination of the terminal key and an identifier of the terminal device 20. In this way, the information processing system 1 can prevent the terminal key card 40 from being misused in another terminal device 20 even when the terminal key card 40 is lost.

The processes according to an embodiment of the present invention may be interchanged in order within a range in which appropriate processes are performed.

According to an embodiment of the present invention, each of the storage units 101, 201, 301, and 401 and the other storage units may be included in any location within a range in which information is appropriately transmitted and received. A plurality of the storage units may be within a range in which information is appropriately transmitted and received and data may be distributed and stored.

The embodiments of the present invention have been described, but the information processing system 1, the terminal device 20, the server 30, and the other control devices described above may include a computer system therein. A course of the above-described processes may be stored in a computer-readable recording medium in a program format and the processes are performed by a computer processor reading and executing the program. A specific example of the computer will be described below.

Figure 14:
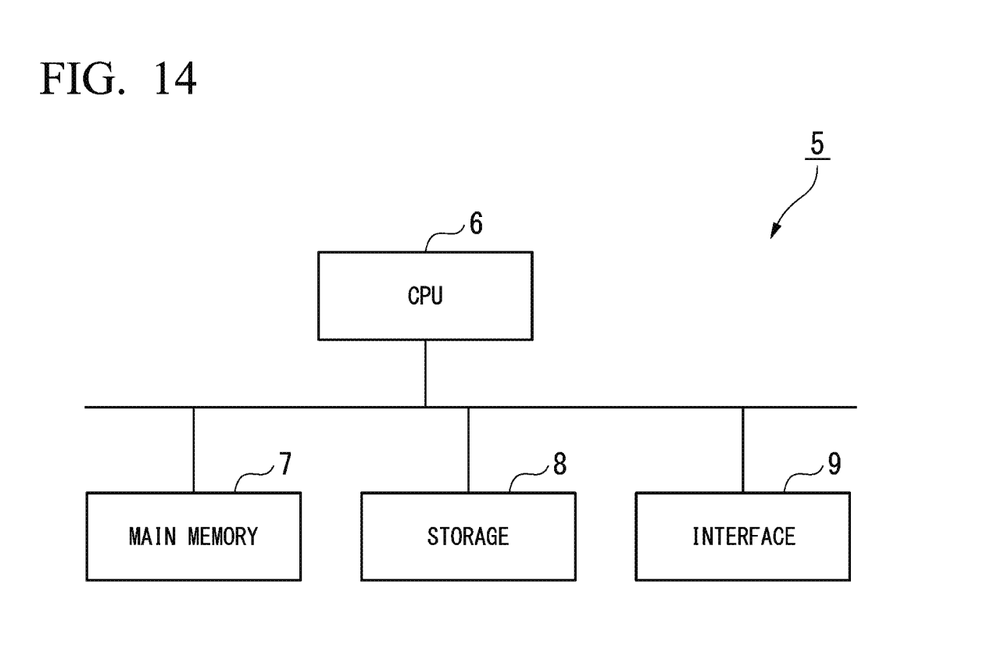
FIG. 14 is a schematic block diagram showing a configuration of a computer according to at least one embodiment.

FIG. 14 is a schematic block diagram showing a configuration of a computer according to at least one embodiment. As shown in FIG. 14, a computer 5 includes a central processing unit (CPU) 6, a main memory 7, a storage 8, and an interface 9.

For example, each of the information processing system 1, the terminal device 20, the server 30, and the other control devices described above is mounted in the computer 5. An operation of each of the above-described processing units is stored in the storage 8 in a program format. The CPU 6 reads a program from the storage 8, loads the program on the main memory 7, and executes the foregoing process in accordance with the program. The CPU 6 reserves a memory region corresponding to each of the above-described storage units in the main memory 7 in accordance with the program.

Examples of the storage 8 include a hard disk drive (HDD), a solid-state drive (SSD), a magnetic disk, a magneto-optical disc, a compact disc read only memory (CD-ROM), a digital versatile disc read only memory (DVD-ROM), and a semiconductor memory. The storage 8 may be an internal medium directly connected to a bus of the computer 5 or may be an external medium connected to the computer 5 via the interface 9 or a communication line. When the program is delivered to the computer 5 via a communication line, the computer 5 to which the program is delivered may load the program on the main memory 7 and perform the foregoing processes. In at least one of the embodiments, the storage 8 is a non-transitory recording medium.

The foregoing program may realize some of the above-described functions. Further, the program may be a file in which the above-described functions can be realized in combination with a program recorded in advance on the computer system, that is, a so-called differential file (a differential program).

While preferred embodiments of the present invention have been described, it should be understood that these are exemplary examples of the invention and are not to be considered as limiting the scope of the present invention. Additions, various omissions, substitutions, and other modifications of the embodiments can be made without departing from the spirit or scope of the present invention.

Priority is claimed on Japanese Patent Application No. 2017-054250, filed Mar. 21, 2017, the content of which is incorporated herein by reference.

INDUSTRIAL APPLICABILITY

The present invention can be applied to a use in which it is necessary for a device with high versatility to perform authentication while ensuring security in the authentication.

REFERENCE SIGNS LIST

1 Information processing system
5 Computer
6 CPU
7 Main memory

8 Storage
9 Interface
10 IC card
20 Terminal device
30 Server
40 Terminal key card
101, 201, 301, 401 Storage unit
102 303, 402 Communication unit
202 Card read/write unit
203 Terminal key acquisition unit
204 Authentication unit
205 Information processing unit
206 Display control unit
207 Card key acquisition unit
208 First con unit
209 Second communication unit
302 Information management processing unit

The invention claimed is:

1. A terminal device configured to process record information of an IC card in communication with a server, the terminal device comprising:
at least one memory configured to store instructions; and
at least one processor configured to execute the instructions to:
acquire an encrypted terminal key from a secondary card different from the IC card, wherein the encrypted terminal key represents a terminal key encrypted by a first key;
transmit the encrypted terminal key to the server for its authentication such that the server acquires the first key from the encrypted terminal key;
receive the first key from the server;
decrypt the encrypted terminal key using the first key, thus reproducing the terminal key;
transmit an encrypted request signal encrypted by the terminal key to the server such that the server decrypts the encrypted request signal to obtain a second key and to transmit to the terminal device an encrypted second key encrypted by the terminal key;
decrypt the encrypted second key using the terminal key, thus reproducing the second key; and
communicate with the IC card using the second key.

2. The terminal device according to claim 1, wherein the processor is further configured to:
acquire from the IC card its record information encrypted by the second key;
perform a predetermined process using the record information, thus producing a processing result;
encrypt the processing result using the second key; and
write the encrypted processing result on the IC card.

3. An information processing system comprising:
an IC card configured to record its record information, which is different from a secondary card configured to store an encrypted terminal key representing a terminal key encrypted by a first key;
a server; and
a terminal device comprising a memory configured to store instructions and a processor configured to execute the instructions to:
acquire the encrypted terminal key from the secondary card;
transmit the encrypted terminal key to the server for its authentication such that the server acquires the first key from the encrypted terminal key;
receive the first key from the server;
decrypt the encrypted terminal key using the first key, thus reproducing the terminal key;
transmitting an encrypted request signal encrypted by the terminal key to the server such that the server decrypts the encrypted request signal to obtain a second key and to transmit to the terminal device an encrypted second key encrypted by the terminal key;
decrypt the encrypted second key using the terminal key, thus reproducing the second key; and
communicate with the IC card using the second key.

4. A communication method for a terminal device configured to process record information of an IC card in communication with a server, the communication method implemented by the terminal device comprising:
acquiring an encrypted terminal key from a secondary card different from the IC card, wherein the encrypted terminal key represents a terminal key encrypted by a first key;
transmitting the encrypted terminal key to the server for its authentication such that the server acquires the first key from the encrypted terminal key;
receiving the first key from the server;
decrypting the encrypted terminal key using the first key, thus reproducing the terminal key;
transmitting an encrypted request signal encrypted by the terminal key to the server such that the server decrypts the encrypted request signal to obtain a second key and to transmit to the terminal device an encrypted second key encrypted by the terminal key;
decrypting the encrypted second key using the terminal key, thus reproducing the second key; and
communicating with the IC card using the second key.

* * * * *